(12) United States Patent
Tischer

(10) Patent No.: US 6,457,376 B1
(45) Date of Patent: Oct. 1, 2002

(54) TRAVEL MEASURING AND CONTROL DEVICE FOR MOTOR VEHICLE TRANSMISSIONS

(75) Inventor: Dieter Tischer, Wendlingen (DE)

(73) Assignee: Hydraulik-Ring GmbH, Nürtingen (DE)

( * ) Notice: Subject to any disclaimer, the term of this patent is extended or adjusted under 35 U.S.C. 154(b) by 1 days.

(21) Appl. No.: 09/603,298

(22) Filed: Jun. 23, 2000

(30) Foreign Application Priority Data

Jun. 25, 1999 (DE) .......................... 199 29 038

(51) Int. Cl.$^7$ .................. F16H 59/02; F16H 63/40
(52) U.S. Cl. ................ 74/473.36; 74/DIG. 7; 116/28.1
(58) Field of Search ................ 33/606, 1 PT, 33/600; 116/28.1, 28 R; 74/469, 471 R, 473.1, 473.3, 473.36, DIG. 7; 92/5 R; 180/337, 347

(56) References Cited

U.S. PATENT DOCUMENTS

| | | | | |
|---|---|---|---|---|
| 4,095,424 A | * | 6/1978 | Laky .................. 74/471 R |
| 4,565,151 A | * | 1/1986 | Buma .................. 116/28.1 |
| 4,782,782 A | * | 11/1988 | Nill .................. 116/28.1 |
| 5,845,538 A | * | 12/1998 | Tornatore .................. 116/28.1 |
| 5,887,351 A | * | 3/1999 | Arms et al. .................. 33/1 PT |

* cited by examiner

Primary Examiner—Christopher W. Fulton
(74) Attorney, Agent, or Firm—Gudrun E. Huckett

(57) ABSTRACT

A travel measuring and control device for a vehicle transmission has a measuring arrangement with one or more measuring elements cooperating with a selector shaft of the transmission and with a measuring device cooperating with the measuring element. The measuring element has one or more measuring surfaces having an incline in an axial direction and in a rotational direction of the selector shaft. An adjustable sensing element rests against the measuring surface and is operatively connected with the measuring device. The measuring element is preferably axially fixedly seated on the selector shaft or an extension of the selector shaft and preferably fixedly seated on the selector shaft or the extension thereof so as to rotate with the selector shaft or extension.

14 Claims, 3 Drawing Sheets

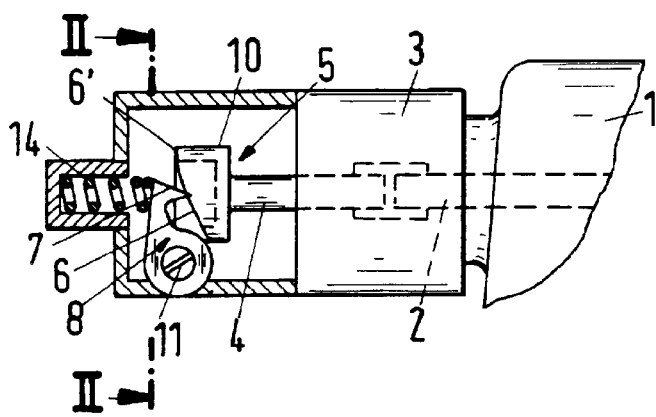
Fig.1
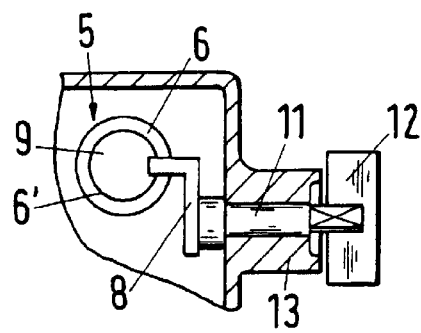
Fig.2
II-II
Fig.3
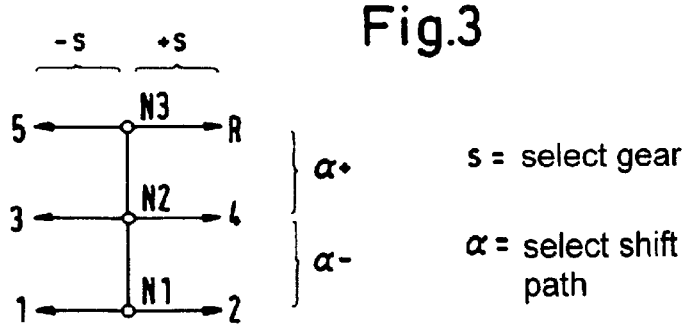
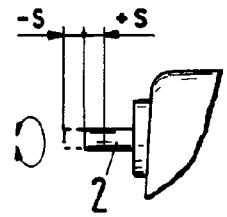
s = select gear
α = select shift path
Fig.4
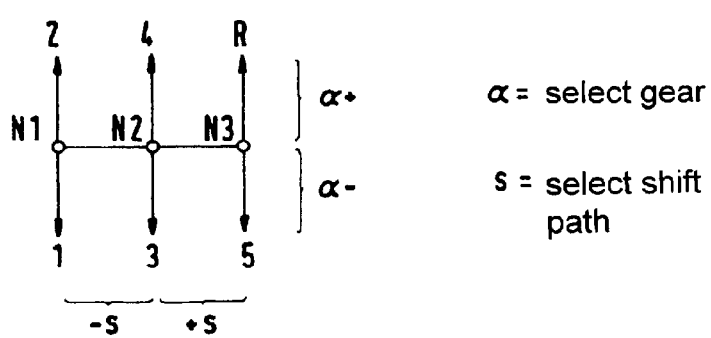
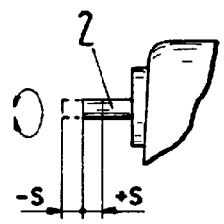
α = select gear
s = select shift path

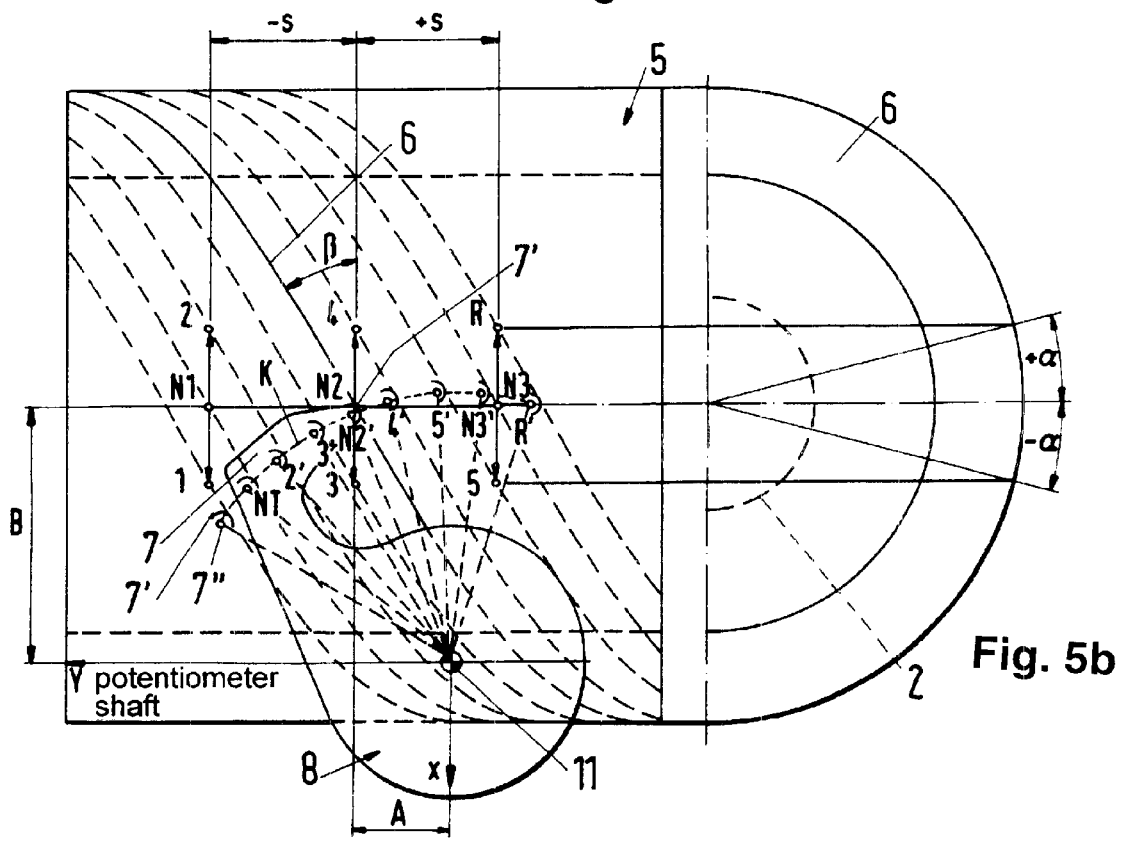
Fig. 5a
Fig. 5b
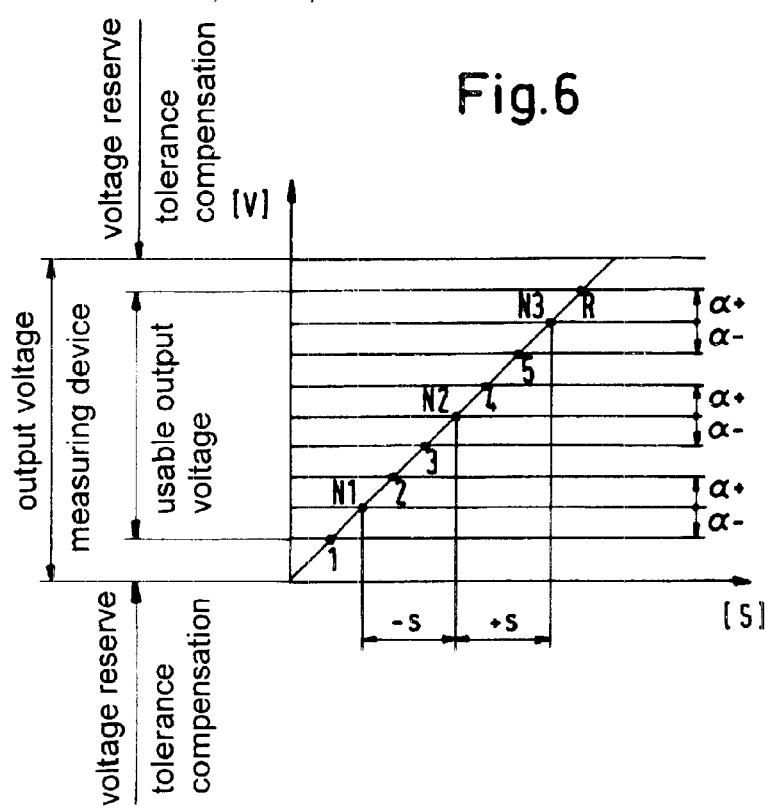
Fig. 6

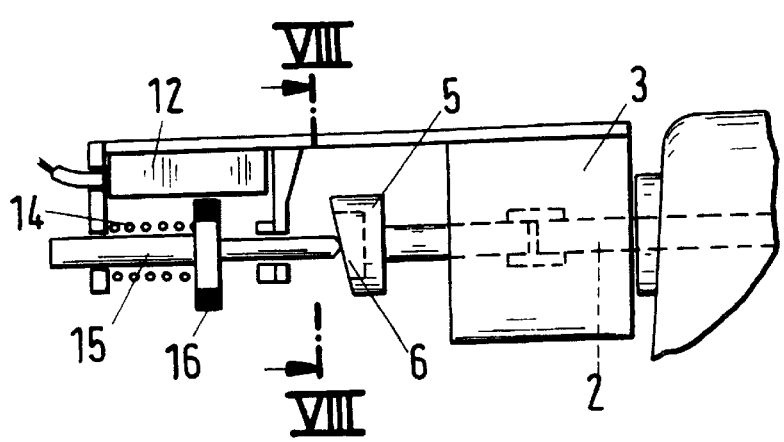
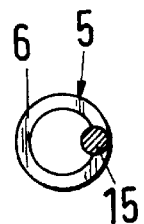
Fig.7
Fig.8
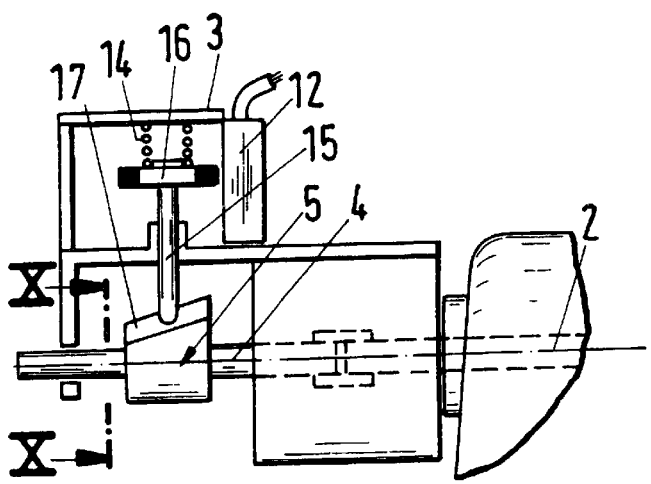
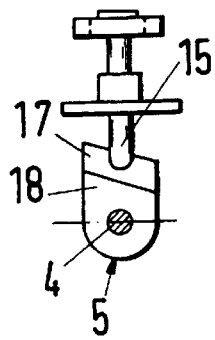
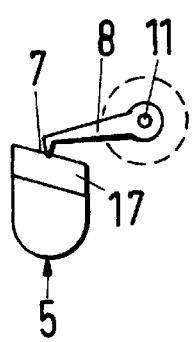
Fig.9
Fig.10  Fig.11

TRAVEL MEASURING AND CONTROL DEVICE FOR MOTOR VEHICLE TRANSMISSIONS

BACKGROUND OF THE INVENTION

1. Field of the Invention

The invention relates to a travel measuring and control device for motor vehicle transmissions comprising a measuring arrangement with at least one measuring element cooperating with the selector shaft of the transmission and with a measuring device cooperating with the measuring element.

2. Description of the Related Art

In semi-automatic manual transmissions of motor vehicles the selector shaft of the motor vehicle transmission is moved in the axial direction and rotated about its axis, for example, in order to select the shift path of the transmission or to shift into gear. In this context, the axial movement and the rotation of the selector shaft are measured by a respective measuring arrangement. Because of these two measuring arrangements, this travel measuring and control device is of a complex configuration and is accordingly expensive to manufacture and requires a correspondingly large mounting space.

SUMMARY OF THE INVENTION

It is an object of the present invention to design a travel measuring and control device of the aforementioned kind such that it can be produced inexpensively, is of constructively simple configuration and requires only minimal mounting space.

In accordance with the present invention, this is achieved in that the measuring element has at least one measuring surface which has an incline in the axial direction and in the rotational direction of the selector shaft and against which at least one adjustable sensing element rests which cooperates with the measuring device.

According to the device of the present invention, only a single measuring arrangement is required for measuring the rotational movement and the displacement path of the selector shaft. Since the measuring surface has an incline in the axial direction and in the rotational direction of the selector shaft, the sensing element resting against it is moved when the selector shaft is rotated as well as when it is axially displaced so that with a single measuring device provided according to the present invention both movements of the selector shaft can be detected or measured. The device according to the invention is thus of a simple configuration and can be produced cost-effectively. Moreover, it requires only a minimal mounting space because of the use of only a single measuring arrangement so that it can be mounted even in vehicles in which only a small amount of space is available for the travel measuring and control device.

BRIEF DESCRIPTION OF THE DRAWING

In the drawing:

FIG. 1 is a schematic representation, partially in section, of the travel measuring and control device according to the invention for a motor vehicle transmission;

FIG. 2 is a section along the line II—II of FIG. 1;

FIG. 3 is a shifting diagram of a first type of a motor vehicle transmission;

FIG. 4 is a shifting diagram of a second type of a motor vehicle transmission;

FIG. 5*a* shows on an enlarged scale a side view of a measuring element of the device according to the invention according to FIGS. 1 and 2 with a pivot lever resting against the measuring element;

FIG. 5*b* shows the measuring element in an axial view (end view);

FIG. 6 shows a voltage-travel-diagram of the device of FIGS. 1 and 2 according to the invention;

FIG. 7 shows schematically a side view of a second embodiment of the travel measuring and control device according to the invention for a motor vehicle transmission;

FIG. 8 is a view along the line VIII—VIII of FIG. 7;

FIG. 9 shows in a representation corresponding to FIG. 7 a third embodiment of the travel measuring and control device according to the invention for a motor vehicle transmission;

FIG. 10 is a view along the line X—X in FIG. 9; and

FIG. 11 shows in a representation corresponding to FIG. 10 a further embodiment of the travel measuring and control device according to the invention for a motor vehicle transmission.

DESCRIPTION OF THE PREFERRED EMBODIMENTS

The travel measuring and control device according to the invention is designed for a semi-automatic motor vehicle transmission. Such transmissions have a selector shaft which can be rotated about its axis and axially moved by two actuators in order to be able to select a shift path of the gear box and to select the gears. FIG. 1 shows a portion of a gear box 1 whose selector shaft 2 is coupled in a gear selector 3 with an extension 4 so as to rotate and axially move together. It is, of course, also possible to embody the selector shaft 2 as a continuous shaft without an extension 4 being required. On the free end of the extension 4 a measuring element 5 is fixedly seated so as to rotate and move axially with the extension 4. The measuring element 5 has an end face portion 6 which is positioned at a slant angle different from 90° to the axis of the extension 4. It extends, for example, over an angular range of 180°. The remaining end face portion 6' is embodied as a plane surface which is positioned at an angle of 90° to the axis of the extension 4. The entire end face 6, 6' is embodied as an annular surface (FIG. 2). A sensing body 7 provided at the free end of a single arm pivot lever 8 rests against the end face portion 6. The measuring elements 5 is cup-shaped and has a bottom 9 extending perpendicularly to the axis of the extension 4, wherein an annular wall 10 projects perpendicularly from the bottom 9. The annular end face 6, 6' is provided with this annular wall 10.

The pivot lever 8 is seated fixedly on a shaft 11 so as to rotate with the shaft 11. The shaft 11 is positioned perpendicularly to the extension 4 and is arranged in the area below the extension 4 (FIG. 1) in the mounted position of the device according to the invention. The shaft 11 cooperates with a measuring device 12 which is only schematically indicated in FIG. 2 and which is, for example, in the form of a rotary potentiometer. The measuring device 12 is advantageously mounted on the housing of the gear selector 3. The shaft 11 is rotatably supported in a reinforced housing projection 13 (FIG. 2).

The sensing body 7 is loaded in the direction toward the end face 6, 6' by at least one spring 14 which engages the pivot lever 8 in the vicinity of its free end remote from the shaft 11.

When the selector shaft 2 and thus the extension 4 are axially displaced, the measuring element 5 is correspondingly moved also. By means of the sensing body 7 resting against the end face portion 6 of the measuring element 5, the pivot lever 8 is pivoted clockwise or counter-clockwise. Since it is fixedly connected to the shaft 11, the shaft 11 is accordingly rotated. When in the representation according to FIG. 1 the selector shaft 2 is moved to the left, the pivot lever 8 is moved counter-clockwise against the force of the pressure spring 14. When the selector shaft 2, on the other hand, is moved to the right in FIG. 1, the pivot lever 8 is pivoted by the force of the pressure spring 14 in the clockwise direction. The corresponding rotational movement of the shaft 11 is detected or measured by the measuring device 12.

When the selector shaft 2 and thus the extension 4 are rotated about their axis in any given axial position of the selector shaft 2 and the extension 4, the measuring element 5 is also rotated about its axis that coincides with the axis of the selector shaft 2/extension 4. Since the end face portion 6 of the measuring element 5 is positioned at an angle different from 90° to the axis of the selector shaft 2 or the extension 4, the rotation of the measuring element 5 also results in the pivot lever 8 being pivoted. Depending on the rotational direction of the selector shaft 2, the pivot lever 8 is pivoted clockwise or counter-clockwise.

FIG. 3 shows in an exemplary fashion a shifting schematic of a transmission having five gears as well as a reverse gear and three shift paths. In order to select any of the gears 1 through 5 and R (reverse), the selector shaft 2 is moved by the travel stroke −s or +s. In order to select the desired shift path N1, N2, or N3 for the gear to be selected, the selector shaft 2 is rotated about its axis by the amount α+ or α−.

FIG. 4 shows a different type of transmission in which the respective shift path of the transmission is selected by axial displacement (+s, −s) of the selector shaft 2. Once the respective shift path N1, N2, or N3 is reached, the selector shaft 2 is subsequently rotated by the amount α+ or α− for selecting the desired gear.

FIGS. 5a, 5b show the measuring element 5 in a concrete embodiment. The measuring surface 6 is formed as a ring segment surface, when viewed in the axial direction (FIG. 5b), which extends over 180°. The measuring surface 6 has a constant incline gradient along half of its diameter. The pivot lever 8, whose shaft 11 (representing the pivot axis) is arranged in the area below the axis of the selector shaft 2, rests with an advantageously rounded edge 7' or spherical tip of the sensing body 7 on the measuring surface 6 at the level of the axis of the selector shaft 2. In the shown position, the sensing body 7 is in a neutral position N2 corresponding to the central shift path of the transmission or gear box 1. From this central neutral position N2 the pivot lever 8 can be pivoted clockwise and counter-clockwise about the shaft 11 when the measuring element 5 is rotated in the desired direction about its axis or is moved in the axial direction. The rounded edge 7' is part-cylindrical and has a curvature axis 7". When pivoting the pivot lever 8, this curvature axis 7" is moved about the shaft 11 along the circular arc K indicated by the dashed lines in FIG. 5a. At the same time, the contact line between the measuring surface 6 and the part-cylindrical edge surface 7' moves on the part-cylindrical edge surface, depending on the pivot angle of the pivot lever 8. Due to the part-cylindrical embodiment of the edge surface the friction is only minimal so that the pivot lever 8 can be reliably pivoted even for small displacements of the selector shaft 2.

When the pivot lever 8 is in the position illustrated in FIG. 5, it is in the central neutral position N2 of the gearbox 1. In this position, the fourth or the third gear can be selected upon rotation of the measuring element 5 in the positive rotational direction (rotational angle+α) or in the negative rotational direction (rotational angle −α), as can be seen in FIG. 4. When the measuring element 5 is rotated, the position of the measuring surface 6 is changed, as is illustrated in FIG. 5a by the thin dashed lines. This rotational movement of the measuring element 5 does not cause an axial movement of the measuring element.

In order to be able to move into the other two neutral positions N1 or N3 of the gearbox 1 starting from the central neutral position N2, the measuring element 5 must be axially moved by the travel stroke −s or +s. When this is done, the measuring surface 6 changes its axial position and is located in the neutral position N1 or in the neutral position N3 at the locations indicated with thick dashed lines in FIG. 5a. This axial displacement of the measuring element 5 causes the curvature axis 7" to move along the circular arc K into the position N1' or N3'.

When the edge 7' of the sensing body 7 is located in the position N1', which corresponds to the neutral position N1 of the gear box 1, the second or the first gear can be selected by rotation of the measuring element 5 by a positive or negative angle +α or −α. This rotational movement of the measuring element 5 about its axis causes the measuring surface 6 to move by the angle +α or −α. This causes pivoting of the pivot lever 8 about the shaft 11 so that the curvature axis 7" of the rounded edge 7' is moved into the position 1' or 2'.

When the neutral position N3 of the gearbox is selected, the measuring surface 6 is in the position indicated by the thick dashed line. When the measuring element 5 is now rotated about its axis by the angle +α or −α, the reverse gear or the fifth gear can be selected starting from this neutral position N3. This rotational movement of the measuring element 5 moves the measuring surface 6 accordingly so that the pivot lever 8 is pivoted such that the curvature axis 7" is moved into the position R' or 5'. In the neutral position N3 the curvature axis 7' is located at the position N3'.

FIG. 6 shows the voltage-travel-diagram of the measuring device 12 corresponding to FIG. 5a. In the gearbox 1 the switching strokes +s and −s as well as the rotary angle is +α and −α are constructively predetermined and not changeable. The incline angle β of the measuring surface 6 as well as the spacings A and B between the shaft 11 of the pivot lever 8 from the radial plane extending through the neutral position N2 or from the axis of the measuring element 5 must be adjusted relative to one another such that in the voltage-travel-diagram according to FIG. 6 the spacing between 1st gear and the reverse gear R is divided into eight voltage sections that are at least approximately identical. This ensures that a correspondingly higher voltage value corresponds to the respectively next higher forward gear. Accordingly, by means of the level of the respective voltage a precise correlation of the corresponding forward gear of the gear box 1 is possible. The highest voltage value is reached when selecting the gear with the smallest ratio of transmission (reverse gear R).

Based on the described embodiment with a single measuring device 12, the axial displacement as well as the rotary displacement of the selector shaft 2 can be measured. The travel measuring and control device is thus of a very simple configuration and can accordingly be produced cost-effectively, requires only a few components and is correspondingly compact.

In a motor vehicle gear box with a shifting schematic according to FIG. 3 the selection of the shift paths N1, N2, N3 is not carried out by an axial movement of the selector shaft 2 but by rotation of the selector shaft 2 about its axis. When positioned in the respectively selected shift path, the selector shaft 2 and thus the measuring element 5 are moved by the travel stroke +s or −s in order to select the respective gear. In such a gearbox configuration, a single measuring arrangement and a single measuring device 12 are also sufficient to detect and measure the rotational movement and the axial movement of the selector shaft 2.

The travel measuring and control device can also be used for motor vehicle transmissions which have of reduced number of gears or more gears than the described motor vehicle transmission. The basic function of the device is not affected by this.

In the embodiment according to FIGS. 7 and 8 a spring-loaded plunger 15 is positioned at the slanted end face 6 of the measuring element 5. The plunger 15 supports a magnet 16. In the shown embodiment the magnet 16 is annular but it can also have a ring segment shape, a cylindrical shape, or a parallelepipedal shape. The plunger 15 is advantageously in the form of a cost-effective bearing needle. It is moveably supported in the housing of the gear selector 3 and is subjected to the force of the pressure spring 14 which is supported with one end on the housing of the gear box 3 and with its other end on the magnet 16. The magnet 16 can be moved in the longitudinal direction along the measuring device 12 which is arranged in a protected arrangement in the housing of the gear box 3. The measuring device 12 is advantageously a contactless sensor. However, it is also possible to employ a potentiometer as the measuring device 12. In this case, a sliding contact can be used instead of the magnet 16.

As has been explained in detail with the aid of the previous embodiments, the axial displacement of the selector shaft 2 moves the measuring element 5 accordingly. The plunger 15 acting on the annular end face 6 of the measuring element 5 is accordingly moved by a corresponding amount. Since the magnet 16 is axially fixedly seated on the plunger 15, the magnet 16 moves along the measuring device 12 which thus provides corresponding measuring signals. When the selector shaft 2 and thus the measuring element 5 are rotated about their axes, the slantedly positioned end face 6 causes the plunger 15 with the magnet 16 to move according to the incline of the measuring surface 6 also axially along the measuring device 12 which thus provides corresponding signals. The plunger 15 is positioned parallel to the axes of the measuring element 5 and the selector shaft 2.

The function of this embodiment corresponds completely to the one with the pivot lever 8 explained in connection with FIGS. 5a, 5b, and 6. In contrast to the previous embodiment, the plunger 15 does not move along a circular path but along a straight line.

In the embodiment according to FIGS. 7 and 8 there is also only a single measuring arrangement with measuring device 12 provided in order to measure the rotational and axial movement of the selector shaft 2. Depending on the type of motor vehicle gearbox (transmission), the rotation of the selector shaft 2 can be used to select the respective shift path of the gearbox or the desired gear. Accordingly, when axially moving the selector shaft, either the gear is selected or the shift path for a desired gear is selected.

In the embodiment according to FIGS. 9 and 10, the measuring element 5 is fixedly seated on the extension 4 so that it rotates and moves axially with the extension 4. When the extension 4 is axially moved or rotated about its axis by the selector shaft 2, the measuring element 5 is accordingly also axially moved or rotated about the axis of the extension 4. The measuring element 5 has a pivot arm 18 which has a slanted surface 17 at its free end. This slanted surface 17 is upwardly inclined in the axial displacement direction of the selector shaft 2 as well as transverse thereto. The plunger 15 rests against the slanted surface 17 by means of a spring force. The plunger 15 is supported in the housing of the gear selector 3 and supports at its free end the annular magnet 16 which cooperates with the measuring device 12. The pressure spring 14 loading the plunger 15 in the direction toward the measuring element 5 rests with one end against the annular magnet 16 and with the other end against the housing wall of the gear selector 3.

The measuring device 12 is preferably a contactless sensor which cooperates with the annular magnet 16. However, the measuring device 12 can also be a potentiometer and the annular magnet 16 is then replaced by a sliding contact.

When the selector shaft 2 is moved in the axial direction, the slanted surface 17, inclined upwardly or downwardly in the displacement direction, causes the plunger 15, which is arranged perpendicularly to the axis of the extension 4, to be axially moved. When the selector shaft 2 is moved to the left in the representation according to FIG. 9, the plunger 15 is moved against the force of the pressure spring 14 in the upward direction. When the selector shaft 2 is moved to the right in FIG. 9, the plunger 15 is moved by the force of the pressure spring 14 in the downward direction.

When the selector shaft 2 is rotated about its axis, an axial movement of the plunger 15 occurs also because the slanted surface 17 has an upward incline not only in the axial direction of the selector shaft 2 but also transverse thereto. When the selector shaft 2, or the extension 4 coupled thereto, is thus rotated about its axis, the plunger 15 is also axially moved by means of the slanted surface 17.

The movement stroke of the plunger 15 and the voltage values generated by the measuring device 12, as has been explained in detail in connection with FIGS. 5a, 5b, and 6, are adjusted relative to one another such that the measuring device 12 unequivocally determines which shift path has been selected or which gear has been selected. This has been explained in detail in connection with FIGS. 5a, 5b, and 6. The contact end of the plunger 15, as in the previous embodiment, is dome-shaped so that friction between it and the slanted surface 17 of the measuring element 5 is minimal.

As illustrated in FIG. 11, it is also possible that the pivot lever 8 of the embodiment according to FIGS. 1 and 2 is used with the slanted surface 17. The sensing body 7 will then rests against the slanted surface 17. In this case, the shaft 11 on which the pivot lever 8 is fixedly seated extends parallel to the extension 4 or the selector shaft 2. Upon rotation or displacement of the measuring element 5, the pivot lever 8, as has been explained in detail in connection with FIGS. 1 through 6 is pivoted. Accordingly, in this embodiment it is also possible to detect and measure the axial movement and the rotational movement of the selector shaft 2 with only one measuring arrangement with measuring device 12.

The slanted surface 17 in the embodiments according to FIGS. 9 through 11 is planar. Of course, it is also possible to shape the slanted surface 17 in the rotational direction of the selector shaft and/or transverse thereto so as to have a curvature. However, this curvature has to be designed such that the plunger 15 is axially moved or the pivot lever 8 is pivoted when the selector shaft 2 and thus the measuring element 5 is rotated or axially displaced. The curved slanted surface 17 can thus have an incline in the rotational direction of the selector shaft 2 and the measuring element 5.

While specific embodiments of the invention have been shown and described in detail to illustrate the inventive principles, it will be understood that the invention may be embodied otherwise without departing from such principles.

What is claimed is:

1. A travel measuring and control device for a vehicle transmission, said travel measuring and control device comprising:

a measuring arrangement comprising one or more measuring elements (5) configured to cooperate with a selector shaft (2) of the transmission and further comprising a measuring device (12) configured to cooperate with said measuring element (5);

wherein said measuring element (5) has one or more measuring surfaces (6, 17) having an incline in an axial direction and in a rotational direction of the selector shaft (2);

an adjustable sensing element (7, 8; 15) resting against said measuring surface (6, 17) and operatively connected to said measuring device (12), wherein said sensing element is a plunger (15).

2. The travel measuring and control device according to claim 1, wherein said measuring element (5) is axially fixedly seated on the selector shaft (2).

3. The travel measuring and control device according to claim 2, wherein the selector shaft (2) has an extension (4) and wherein said measuring element (5) is axially fixedly seated on the extension (4).

4. The travel measuring and control device according to claim 2, wherein the selector shaft (2) has an extension (4) and wherein said measuring element (5) is fixedly seated on the extension (4) so as to rotate with the selector shaft (2).

5. The travel measuring and control device according to claim 1, wherein said measuring element (5) is fixedly seated on the selector shaft (2) so as to rotate with the selector shaft (2).

6. The travel measuring and control device according to claim 1, wherein said measuring element (5) has an end face (6) arranged at least on a portion of a circular arc, wherein said end face (6) is inclined at a slant angle different from 90° relative to the axial direction of the selector shaft (2) and forms said measuring surface (6, 17).

7. The travel measuring and control device according to claim 6, wherein said measuring surface (6, 17) is positioned in a plane.

8. The travel measuring and control device according to claim 1, wherein said plunger (15) has a dome-shaped end.

9. The travel measuring and control device according to claim 1, wherein said plunger (15) extends parallel to or perpendicularly to the selector shaft (2).

10. The travel measuring and control device according to claim 1, wherein said plunger (15) comprises at least one magnet (16) configured to move along said measuring device (12) without contacting said measuring device (12).

11. The travel measuring and control device according to claim 10, wherein said magnet (16) has an annular shape, a ring segment shape, a cylindrical shape or parallelepipedal shape.

12. The travel measuring and control device according claim 1, wherein said measuring device (12) is a longitudinal potentiometer.

13. The travel measuring and control device according to claim 1, wherein said measuring device (12) is a rotary potentiometer.

14. The travel measuring and control device according to claim 1, wherein said measuring device (12) is a contactless rotary or angular sensor.

* * * * *